(12) United States Patent
Neeld

(10) Patent No.: US 12,379,700 B2
(45) Date of Patent: *Aug. 5, 2025

(54) REMOTE MANAGEMENT OF ACTIVE CONTAINERS

(71) Applicant: Doubleday Acquisitions LLC, Moraine, OH (US)

(72) Inventor: Jonathan Neeld, Centerville, OH (US)

(73) Assignee: Doubleday Acquisitions, LLC, Monroe, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/203,382

(22) Filed: May 30, 2023

(65) Prior Publication Data

US 2023/0305506 A1 Sep. 28, 2023

Related U.S. Application Data

(63) Continuation of application No. 17/177,783, filed on Feb. 17, 2021, now Pat. No. 11,687,050, which is a
(Continued)

(51) Int. Cl.
*G05B 19/042* (2006.01)
*G06Q 10/083* (2023.01)
(52) U.S. Cl.
CPC ......... *G05B 19/042* (2013.01); *G06Q 10/083* (2013.01); *G05B 2219/2614* (2013.01)
(58) Field of Classification Search
CPC .......... G05B 19/042; G05B 2219/2614; G06Q 10/083
See application file for complete search history.

(56) References Cited

U.S. PATENT DOCUMENTS 7,484,391 B1 2/2009 Moore
11,687,050 B2 6/2023 Neeld
(Continued)

FOREIGN PATENT DOCUMENTS

KR 2017081464 A * 7/2017 .......... F24F 11/0009

OTHER PUBLICATIONS

International Search Report and Written Opinion dated Mar. 18, 2021, for International Application No. PCT/US2020/067524, 13 pages.

*Primary Examiner* — Michael W Choi
(74) *Attorney, Agent, or Firm* — Frost Brown Todd LLP

(57) ABSTRACT

A system for remote access to active shipping containers may gather information and analytics on containers during transit, and allow automated and manual configuration changes to be transmitted, from remote users, to the container during transit. A remote access device capable of long range communication over cellular or satellite networks may be coupled with a control system of the active shipping container, in order to send information from the control system to a remote server, and to receive and provide configuration changes to the control system. The remote access device may also include sensors, or may be coupled with a plurality of sensors that may be placed in an around the container to provide additional and more detailed sources of sensor data. Sensor and status data from containers may trigger automatic configuration changes or notifications, and may also be aggregated to provide high level analytics related to transit lanes.

20 Claims, 7 Drawing Sheets

Related U.S. Application Data continuation of application No. PCT/US2020/067524, filed on Dec. 30, 2020.

(60) Provisional application No. 62/956,810, filed on Jan. 3, 2020.

(56) References Cited

U.S. PATENT DOCUMENTS

| | | | |
|---|---|---|---|
| 2011/0018707 A1* | 1/2011 | Dobson | G08B 13/08 340/572.1 |
| 2011/0221473 A1 | 9/2011 | Huat | |
| 2013/0271290 A1 | 10/2013 | Saenz et al. | |
| 2015/0314671 A1* | 11/2015 | Rajtmajer | B60H 1/005 62/99 |
| 2016/0196527 A1* | 7/2016 | Bose | G06Q 10/0832 705/332 |
| 2017/0148313 A1 | 5/2017 | Zografos | |
| 2018/0088098 A1 | 3/2018 | Mandava et al. | |
| 2019/0044360 A1 | 2/2019 | Neeld | |
| 2019/0044753 A1 | 2/2019 | Neeld | |
| 2019/0250653 A1 | 8/2019 | Conlon | |
| 2019/0287063 A1 | 9/2019 | Skaaksrud et al. | |
| 2020/0101818 A1* | 4/2020 | Holmstrom | B60H 1/00785 |
| 2020/0289740 A1 | 9/2020 | Tamtoro et al. | |
| 2021/0120413 A1 | 4/2021 | Puppala et al. | |

* cited by examiner

REMOTE MANAGEMENT OF ACTIVE CONTAINERS

CROSS REFERENCE TO RELATED APPLICATIONS

This is a continuation of U.S. patent application Ser. No. 17/177,783, entitled Remote Management of Active Containers," filed Feb. 17, 2021, which is itself a continuation of PCT Application No. PCT/US20/67524, entitled "Remote Management of Active Containers," filed Dec. 30, 2020, which claims priority to U.S. Provisional Application No. 62/956,810, entitled "Remote Management of Active Containers," filed Jan. 3, 2020, the disclosures of which are incorporated by reference herein.

FIELD

The disclosed technology pertains to a system for remotely managing active containers and environmentally controlled active containers.

BACKGROUND

Active shipping and storage containers have become increasingly complex as the quantity, cost, fragility, and perishability of goods that are stored or shipped in commerce has grown. Specific features of an active shipping container may vary, but commonly they will include sensors and localized data storage devices configured to create records of location, temperature, battery supply, and other characteristics throughout transit of the active shipping container, as well as a system for climate control, electronic access control, and visual or audible alerts for errors or mishandling. As a result, expensive medicines, electronics, and other goods that may previously have been delivered by a specialized courier service may instead be packed in active shipping containers and carried using ordinary shipping means.

With the increasing set of features available for active shipping containers, there often follows an increased complexity, as well as an increased need to properly configure the active shipping container before transit begins to account for various unexpected circumstances. As an example, unexpected weather events may result in road closures, flight cancellations, or failures of climate control equipment. While a courier familiar with the active shipping container may be able to check and configure the settings directly in order to adjust temperature ranges, change battery settings, charge batteries, provide alternate power sources, or otherwise reconfigure the active shipping container to adapt to the changing transit plan, such intervention is not always possible or available.

In some cases, a courier of an active shipping container may be completely unfamiliar with the device, which can lead to errors in handling. As an example, an empty active shipping container may be in transit to a location where it will be filled with temperature sensitive goods, and may be activated prior to transit to bring temperatures to a desirable level prior to receiving the goods. A driver or other person responsible for handling the active shipping container during transit may notice that the active shipping container is powered on and actively cooling, and may power the device off after mistakenly concluding that the device should be powered off because it is does not yet contain goods. As a result, the active shipping container may be at unsafe levels for packing of the goods upon arrival, or the goods may be damaged as a result of attempting transit in the active shipping container without proper conditioning.

Even where there is no human error that leads to a misconfiguration of the active shipping container (e.g., disabling a container that is being conditioned to receive goods), a flight cancellation, weather condition, or other unpredictable occurrence may result in the active shipping container's battery being exhausted before transit is concluded, which may allow storage temperatures to exceed the desired level. While the active shipping container may be configured to provide audible or visual warnings (e.g., alert tones, flashing lights), such warnings may not be noticed until it is too late to intervene.

It is not uncommon for the value of goods shipped in an active shipping container to exceeds one million dollars or more, and in some cases, especially with medicines and other materials related to medical treatment, the goods can be rendered entirely unusable as a result of even small variations in temperature or other storage conditions from a desired level. As can be seen, there is a need to both identify transit risks associated with an active shipping container as early in a trip as possible, and to be able to intervene and mitigate damages associated with those risks.

What is needed, therefore, is an improved system for remote management of active shipping containers.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

The inventors have conceived of novel technology that, for the purpose of illustration, is disclosed herein as applied in the context of remote management of active shipping containers. While the disclosed applications of the inventors' technology satisfy a long-felt but unmet need in the art of remote management of active shipping containers, it should be understood that the inventors' technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

Described below are various features and implementations of a system for remote access, control, and management of active environmentally controlled containers, or "ATCCs". An implementation of the system includes an ATCC having a cargo area and a control system that is configured to control the climate control system and other active features of the ATCC during transit. A remote access device may be attached to or placed within the cargo area, and may be coupled with the control system to receive data relating to the climate control system, battery status, cargo area temperature, and other information. The remote access device may transmit data from the control system (e.g., the current interior temperature of the cargo area) to remote servers and remote user devices over a long range wireless network, and may also receive communications from those remote devices in the form of configuration changes for the control system of the ATCC (e.g., a new temperature at which the climate control system should maintain the interior of the cargo area). Such an implementation allows for bi-directional communication with the ATCC during transit, and allows a remotely located user to receive information on the ATCC during transit, and change the ATCC's configuration based on that information as may be desired.

Figure 1:
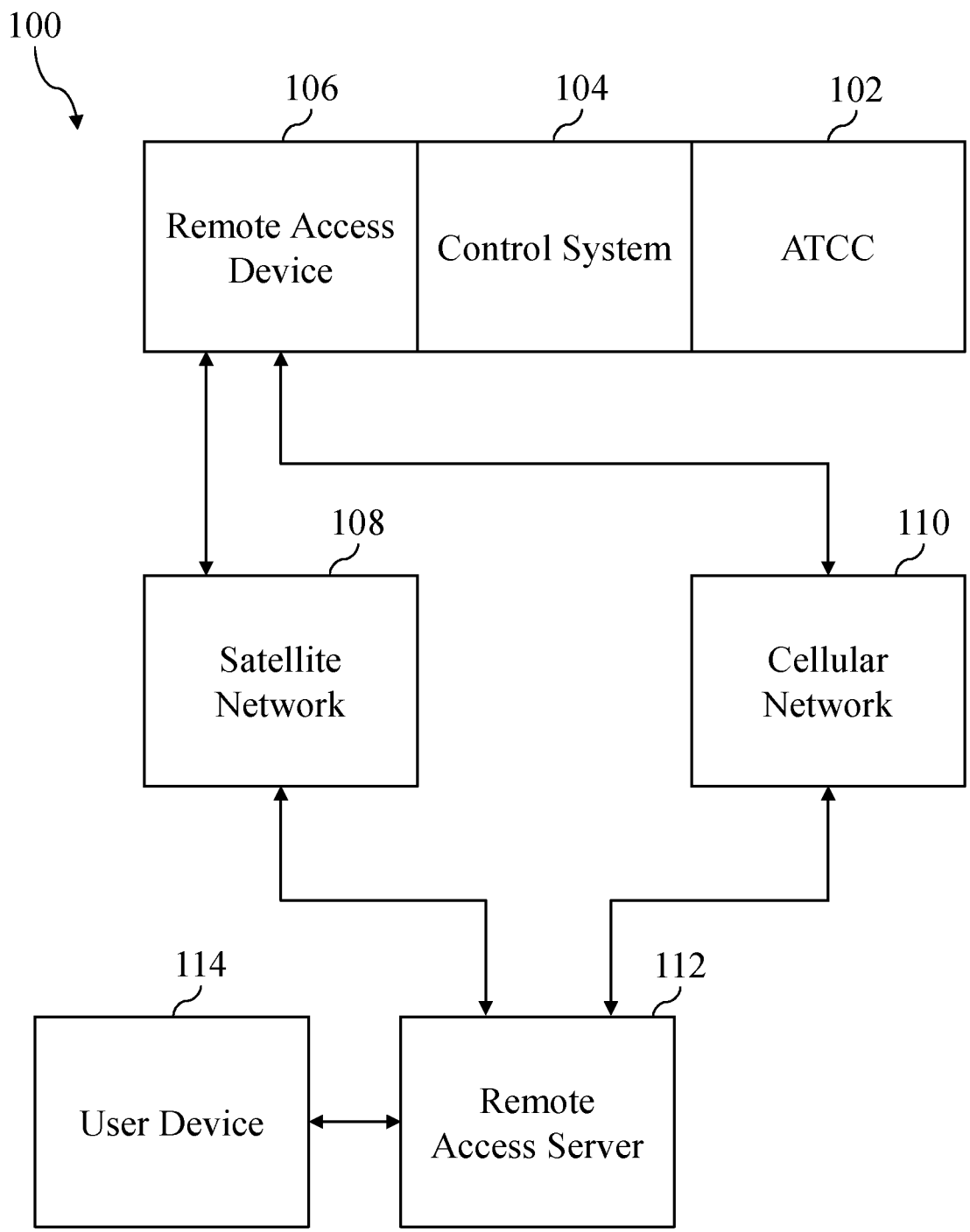
FIG. 1 shows a schematic diagram of an exemplary system for remote access and management of active shipping containers.

Turning now to the figures, FIG. 1 shows a schematic diagram of an exemplary system (100) for remote access and management of active shipping containers, such as an active environmentally controlled container or ATCC (102). While FIG. 1 includes the ATCC (102), it should be understood that active shipping containers having a variety of features, including those with and without active environmental control features such as electrical heating and cooling devices, may be used with the system (100). The ATCC (102) includes an area for storing goods during transit, as well as one or more active features such as environmental control, temperature and location monitoring, visual and audible alerts related to monitored characteristics, automatic locking and security mechanisms, and other similar features. The ATCC (102) includes a control system (104) operable and configurable by a user to control one or more of the active features of the ATCC (102), which may, for example, include adjusting the temperature or humidity at which goods stored in the ATCC (102) are maintained, checking a current power level for a battery providing power to the active features, locking and unlocking a storage portion of the ATCC (102), checking status information for components of the ATCC (102), and other user interactions.

A remote access device (106) may be coupled with the control system (104) as a permanently integrated device (e.g., built into the same casing or form factor of the control system (104)), a temporarily attached device (e.g., via USB or other hardwired connection for transmitting data or data and power), or a wirelessly attached device (e.g., via Bluetooth, Wi-Fi, NFC, or other local wireless communication). As will be described in more detail below, the remote access device (106) may include features such as local and long-range wireless communication, sensor capabilities (e.g., location sensing, temperature sensing, shock sensing), and data storage and processing.

As will be explained in more detail below, the remote access device (106) may provide one or more monitoring and management features to remotely located parties. In some implementations, the control system (104) may not be capable of independent long-range communication via cellular networks or other wireless data networks. As a result, data reported to the control system (104) by sensors and systems of the ATCC (102) may be stored locally to the control system (104), and may be accessed or viewed by a person in possession of or in physical proximity to (e.g., a courier) the ATCC (102). In such implementations, and in the absence of the remote access device (106), data reported to the control system (104) and stored locally may not be available to remotely located parties such as a sender or recipient of the ATCC (102). In such cases, if the sender of the ATCC (102) or another remote party is concerned about the condition of goods stored in the ATCC (102), they have few options beyond contacting the courier and asking them to check the information via the control system (104). Similarly, if the control system (104) detects a hardware error, or an unsafe storage temperature, the control system (104) may be configured to provide local alerts in the form of audible or visual warnings, but the sender or recipient is dependent upon the courier to react to or report such warnings.

In the example of FIG. 1, the control system (104) does not have independent capabilities for bi-directional communication with a cellular network (110) or a satellite network (108). However, the remote access device (106) is capable of bi-directional communication with one, or both, or another long-range data network. By coupling the remote access device (106) with the control system (104), the remote access device (106) may receive information from the control system (104), including sensor and status information, and may also provide information to the control system (104) to change configurations and other settings. The remote access device (106) may change configurations of the control system (104) automatically, in response to various detected conditions (e.g., if the remote access device (106) detects that the ATCC (102) has been powered off by a courier while it should be pre-conditioning to receive goods, it may be automatically powered on), or as a result of a manual configuration change provided by the sender or recipient (e.g., if the recipient decides during transit that the goods should be stored at a lower temperature than initially configured, the temperature may be remotely reconfigured by the recipient during transit).

In addition to allowing a user to remotely reconfigured the ATCC (102) during transit, the remote access device (106) may allow users to receive status information relating to the ATCC (102) as desired, which may include checking a location, temperature, battery level, and other information. In the example of FIG. 1, status information and configuration changes may be communicated via one or both of the satellite network (108) or the cellular network (110).

Communication between a user and the remote access device (106) may be accomplished directly in some cases (e.g., such as where the remote access device (106) may generate cellular text messages that are directly received by the user via a smartphone), or may be through a web interface or software interface provided by a remote access server (112). The user, using a user device (114), may access the remote access server (112) in order to view status information on an ATCC (102), provide configuration changes to an ATCC (102), or both.

The user device (114) may be a computer, laptop, smartphone, tablet device, wearable device, proprietary computing device, or other computing device having a display, processor, memory, communication device, and other features common to such devices. The remote access server (112) may be, for example, one or more physical servers, virtual servers, cloud servers, or other server environments capable of exchanging, storing, and processing information using networks such as the internet, the satellite network (108), the cellular network (110), or other networks. Communication between the user device (114) and the remote access server (112) may be implemented in varying ways, and may include the provision of a website or web interface to the user device (114), the provision of access to an SDK, API or other software interface, a mobile application installed on the user device (114), a desktop application installed on the user device (114), a virtual desktop connection between the user device (114) and the remote access server (112), or other interfaces that will be apparent to one of ordinary skill in the art in light of this disclosure.

Figure 2A:
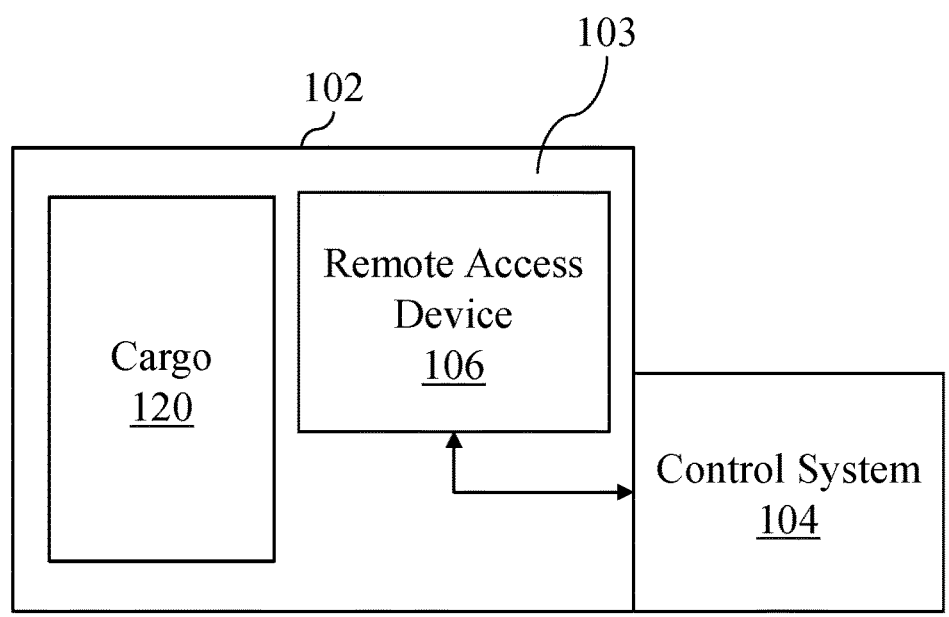
FIG. 2A shows a schematic diagram of an exemplary active shipping container.
Figure 2B:
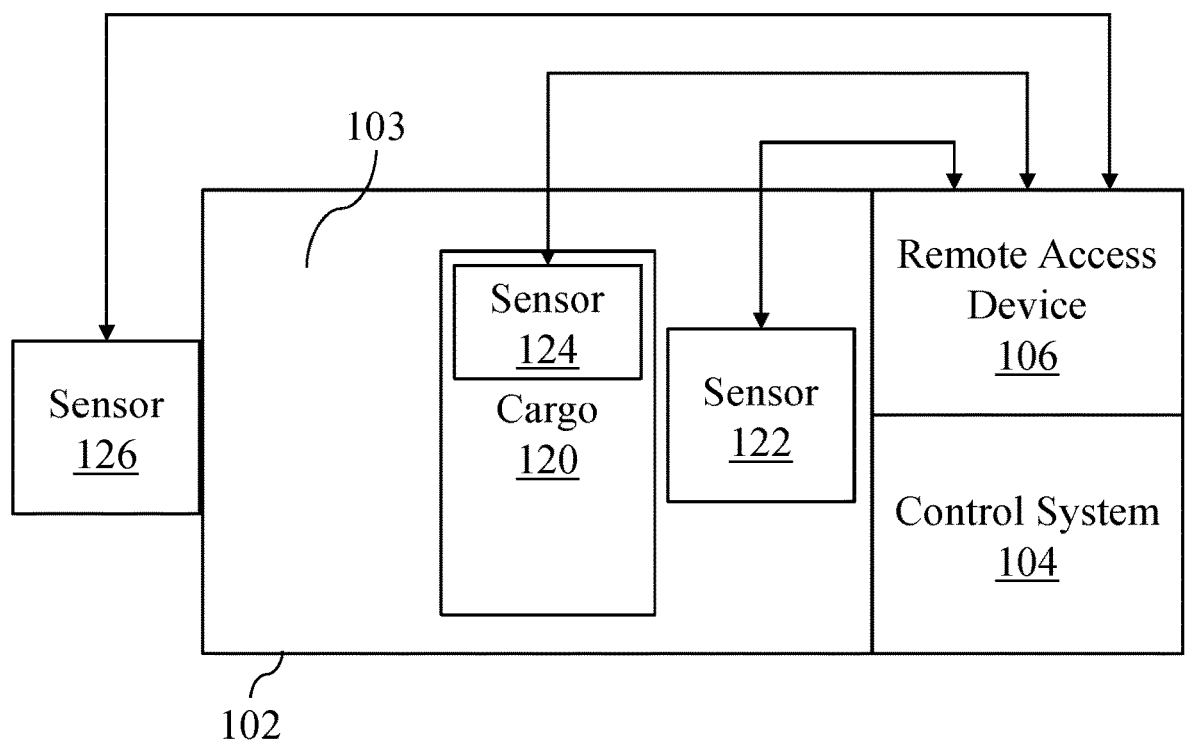
FIG. 2B shows a schematic diagram of an alternate exemplary active shipping container.

As previously mentioned, the remote access device (106) may be coupled with the control system (104) of the ATCC (102) in varying ways. FIGS. 2A and 2B show two such examples. FIG. 2A shows a schematic diagram of the active shipping container (102), including a cargo area (103) that stores a cargo payload (120). In this example, the remote access device (106) is placed within the cargo area (103), and is coupled with the control system (104) via a hardwired or wireless connection. FIG. 2B shows a schematic diagram of the active shipping container (102), with the remote access device (106) exterior to the cargo area (103), and with a hardwired or wireless connection to the control system (104). Also shown are a set of one or more sensors, including a first sensor (122) within the cargo area (103), a second sensor (124) within the cargo payload (120) itself, and a third sensor (126) on an exterior of the cargo area (103). While FIG. 2A shows the set of one or more sensors including three sensors, it should be understood that variable numbers of sensors may be included based upon such factors as the type and size of an active shipping container, the type and distribution of goods within the active shipping container, and other factors as will be described in more detail below. The sensors (122, 124, 126) each include a battery or another power source, and are in wireless communication with the remote access device (106) using a wireless communication method such as Bluetooth, low-energy Bluetooth, Wi-Fi, or other similar local or short-range wireless communication.

Figure 3:
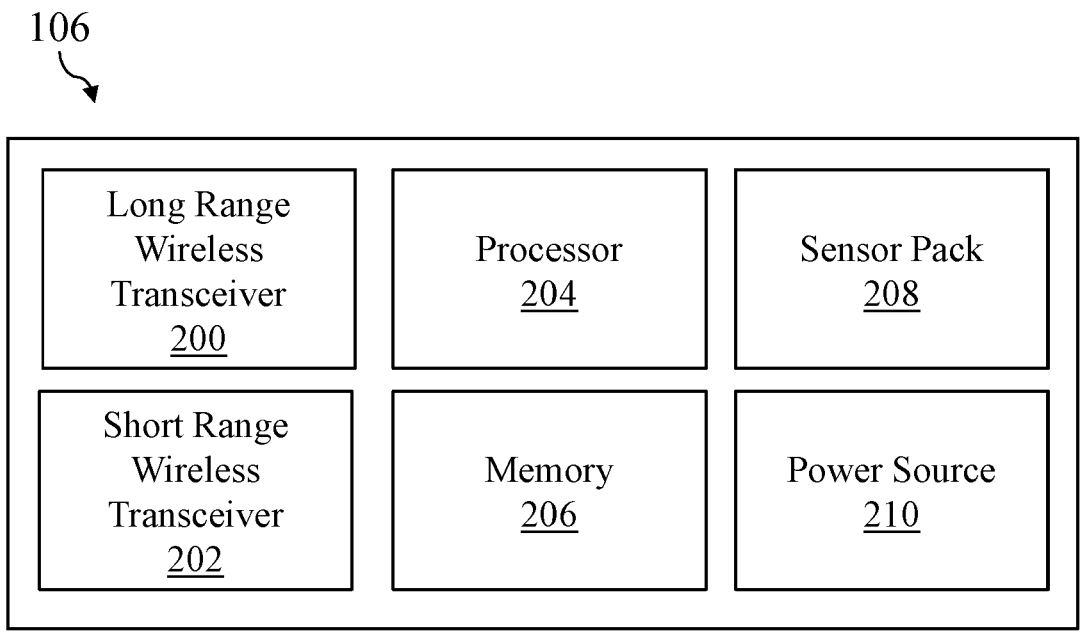
FIG. 3 shows a schematic diagram of an exemplary remote access device.

One or more aspects of the examples of FIGS. 2A and 2B may be desirably implemented with each other, depending upon the capabilities of the remote access device (106), as well as the desired level of tracking for the cargo payload (120). As an example, the remote access device (106) may be temporarily coupled with the control system (104) and placed in the cargo area (102) as shown in FIG. 2A, while also being coupled with the set of one or more sensors (122, 124, 126) as shown in FIG. 2B. Similarly, a permanently integrated version of the remote access device (106) such as shown in FIG. 2B may generate data from its own sensor pack (e.g., a sensor pack (208) as shown in FIG. 3) rather than relying on the set of one or more sensors (122, 124, 126). While some implementations of the remote access device (106) may be configured to provide bi-directional communication with the remote access server (112), other implementations may include sensing capabilities that may replace or augment any sensing capabilities already included in the ATCC (102) or the control system (104).

As an example, FIG. 3 shows a schematic diagram of an exemplary remote access device, such as the remote access device (106). That device includes a long range wireless transceiver (200) (e.g., a transceiver configured to allow communication across the satellite network (108), cellular network (110), or another network), a short range wireless transceiver (e.g., a Bluetooth or Wi-Fi device configured to allow communication with the control system (104), the sensors (122, 124, 126), or other nearby devices), a processor (204) and a memory (206) configured to store and execute software instructions, a sensor pack (208), which may include one or more sensing capabilities, and a power source (210) (e.g., one or more of a battery, a connection that may be coupled with an external power source such as a power system of the ATCC (102), or another power source).

With a remote access device such as that shown in FIG. 3, the ATCC (102) may include a general temperature sensor for the cargo area (103), and the sensor pack (208) may include an additional temperature sensor and a shock sensor (e.g., configured to detect sudden acceleration, deceleration, or other physical forces transmitted through the ATCC (102) as a result of, for example, a traffic accident, falling off a shelf, being crushed by other cargo, etc.). In such a case, the two different sources of temperature data (e.g., the temperature from the control system (104) and the sensor pack (208)) may be used together to verify temperature data or identify a malfunctioning sensor of one or both systems, while the data from the shock sensor provides an entirely new source of transit data, since the ATCC (102) itself does not include such a sensor.

Returning to the examples of FIGS. 2A and 2B, FIG. 2A may be an advantageous implementation where the remote access device (106) includes the sensor pack (208), which may include one or more sensing capabilities that augment any sensing capabilities included in the control system (104) of the ATCC (102), which may include temperature sensing, battery charge detection, or other similar characteristics. In such a case, the remote access device (106) may be placed inside the cargo area (103), and coupled with the control system (104), either via a hardwired connection or wirelessly. In some implementations, where the power source (210) has sufficient charge for the duration of a transit, the remote access device (106) may be activated and placed inside the cargo area (103), where it may automatically couple with the control system (104) via Bluetooth or another wireless communication. In other implementations, the remote access device (106) may be placed in the cargo area (103) and coupled with the control system (104) via a USB or other similar connection that provides both data communication and power to operate the remote access device (106) and charge the power source (210).

The implementation of FIG. 2B may be advantageous where the remote access device (106) does not include the sensor pack (208), or where additional sensing capabilities beyond the sensor pack (208) are desired, such as the set of one or more sensors (122, 124, 126). In that implementation, the remote access device (106) may be placed similarly as shown in FIG. 2A, or may be placed externally as shown in FIG. 2B. The set of one or more sensors (122, 124, 126) may be placed in desirable locations depending upon factors such as the capabilities of each individual sensor, the type and amount of cargo within the cargo area (103), the arrangement of cargo within the cargo area (103), and other factors. For example, where each sensor includes at least a temperature sensing capability, the first sensor (122) may detect the temperature within the cargo area (103), the second sensor (124) may detect the temperature within the case or packaging of the cargo payload (120), and the third sensor (124) may detect the temperature within the vehicle, warehouse, airplane, or other storage area in which the ATCC (102) is currently located. Temperature data may be communicated wirelessly to the remote access device (106), and then transmitted to the remote access server (112) to be viewed, analyzed, or reacted to by users or automated processes.

It should be understood that, while three sensors are shown in FIG. 2B, other numbers and capabilities of sensors may be desirable in varying implementations. For example, where the cargo area (103) contains ten or more separately packaged cargo payloads, each individual payload, or a subset of payloads may contain a sensor configured to produce data describing the temperature, location, shock impacts, and other conditions associated with that payload. By capturing and storing such data, the condition of individual payloads may be determined as may be desirable. This may be useful where, for example, an adverse transit event of some type occurs during transit, such as where a lengthy traffic delay on a hot day causes a storage area of a courier vehicle to become overheated. The climate control systems of the ATCC (102) may become overwhelmed, and the temperature of the cargo area (103) may increase beyond the configured range. In some conventional systems, a temperature reading of the cargo area (103) that indicates temperatures beyond acceptable for the cargo payloads may necessitate that all of the cargo be considered destroyed, damaged, or otherwise unusable.

Where more detailed temperature data is available, such as where the sensor pack (208) or the set of one or more sensors (122, 124, 126) generate temperature data that is more closely associated with an individual payload itself, such as the sensor (124) which is placed within the cargo payload (120), the actual temperature of the cargo payload (120) itself may be determined as being different from that of the cargo area (103) general temperature. This may be true where the cargo payload (120) itself contains passive environmental control features such as insulation, phase change materials, or other features. In such a case, some cargo within the cargo area (103) may be considered lost due to the general temperature, but the cargo more specifically associated with the sensor (124) may be saved and used for its intended purpose.

Furthering the above example, the sensor (126) may detect the overheating interior of the courier vehicle before the climate control systems of the ATCC (102) are overwhelmed, and may report such data to the remote access server (112) so that a user or automated process may intervene in some way. This may include a user changing a configuration of the ATCC (102), which may include activating auxiliary cooling systems or power supplies, notifying the driver of the courier vehicle to adjust the vehicle's climate control systems or vent the cargo area, or other actions.

Figure 4:
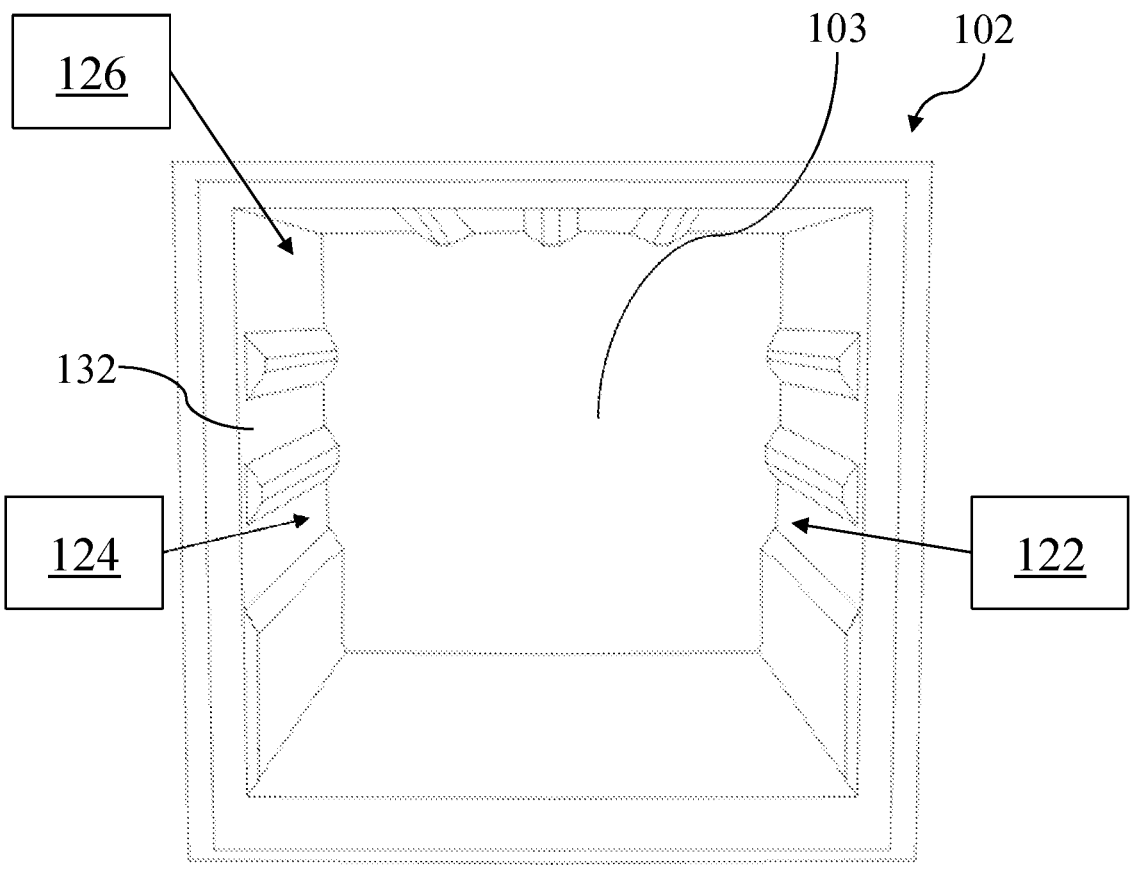
FIG. 4 shows a front perspective view of an exemplary interior for the active shipping container of FIG. 2A or 2B.

The set of one or more sensors (122, 124, 126) may also be distributed within the cargo area (103) based upon locations or zones, rather than being associated with specific cargo payloads. As an example, FIG. 4 shows a front perspective view of an exemplary interior for an active shipping container such as the ATCC (102). As can be seen, the cargo area (103) may include interior features such as circulation channels (132) that allow cooled air to circulate around goods within the cargo area (103). The cargo area (103) may be tightly packed with goods, and one or more climate control systems may circulate cooled air around the tightly packed goods to evenly cool them. If the climate control system were to become overwhelmed or begin to fail, or where thermal energy from the exterior environment were to disproportionately affect one side of the ATCC (102), goods on the right side of the cargo area (103) may be damaged, while goods in the center, bottom, and left side of the cargo area (103) may be undamaged. Output from the distributed sensors may be used to produce mapped sensor data, wherein similar information (e.g., temperature, shock impacts, humidity) may be mapped to different area of the cargo area, based upon the sensor (122, 124, 126) from which the data was received.

To provide more detailed information to address such a scenario, sensors could be distributed about the cargo area (103), within the circulation channels (132) or other empty areas. In this manner, the first sensor (122) may provide temperature data indicating that goods stored in that portion of the cargo area (103) are likely ruined, while goods stored in the portions near the second sensor (124) and the third sensor (126) were maintained at the desired temperature and are undamaged. Such data could be transmitted, via the remote access device (106), to the remote access server (112) and used to intervene and attempt to salvage the at risk goods, or could be used later to determine which cargo is lost and which cargo may be salvaged.

Figure 5:
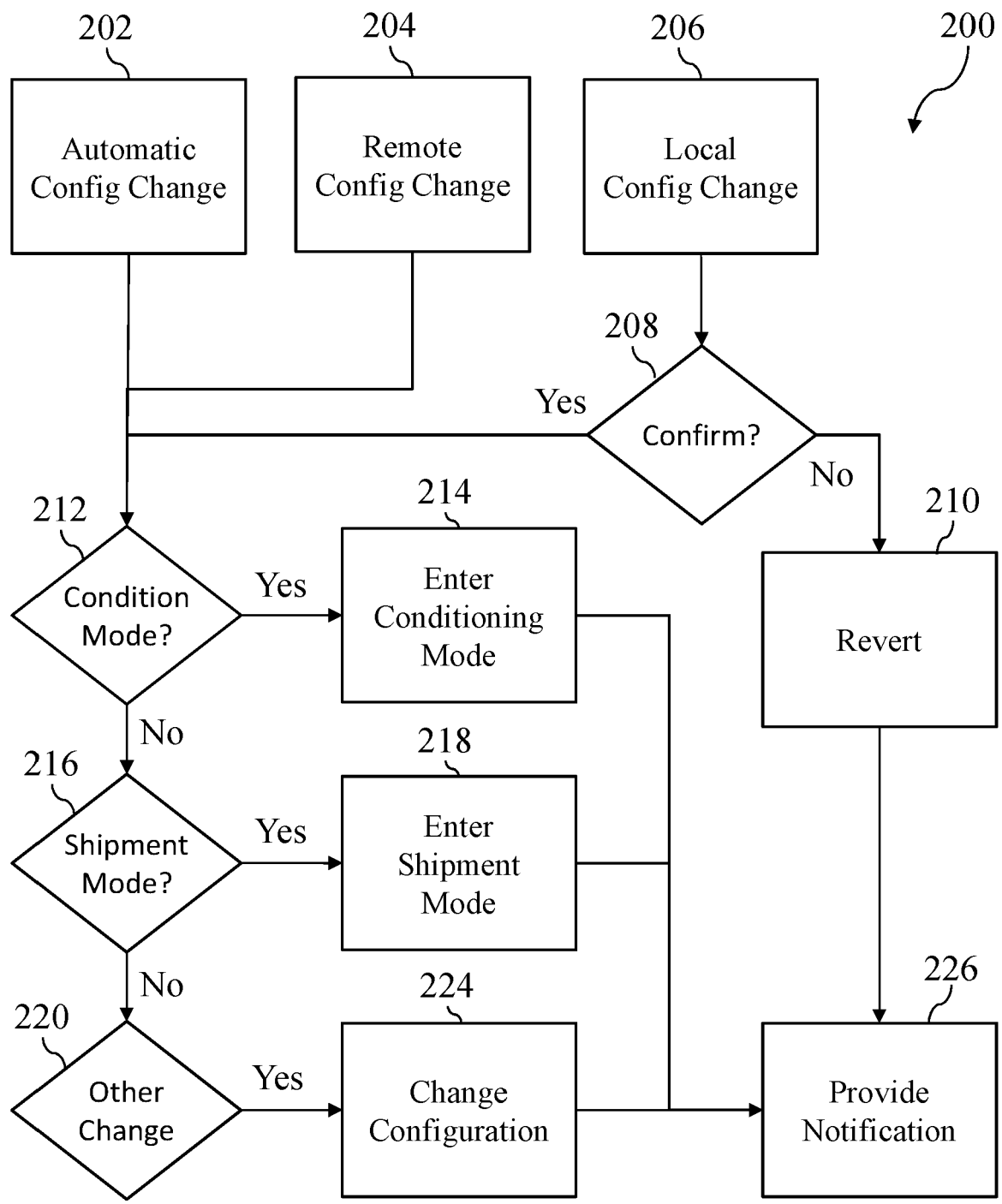
FIG. 5 shows a flowchart of an exemplary set of steps that may be performed with the system of FIG. 1 to remotely manage configuration changes for an active shipping container.

While a number of uses, features, and advantages of the system (100) have been described above, other exist. For example, FIGS. 5-8 show exemplary steps that may be performed with the system to provide additional features. As an example, FIG. 5 shows a flowchart of an exemplary set of steps (200) that may be performed with the system of FIG. 1 to remotely manage configuration changes for an active shipping container. Configuration changes may be received by the remote access device (106) as an automatic change (202), which may include configuration changes that are determined automatically by the remote access server (112) as a result of status information received from the device, remote configuration changes (204) that are received from the user device (114), and local configuration changes (206) that are received via the control system (204), such as by a courier interacting directly with a touchscreen or keypad input of the control system (204) during transit.

When a local configuration change is received (206), the change may be confirmed (208) by either an automatic verification process, or by a notification and manual verification process. As an example, where the ATCC (102) is in conditioning mode and a manual local change powers off the climate control system, the control system (104) may provide data indicating the change or requested change to the remote access device (106), which may transmit data to the remote access server (112) describing the change. At the remote access server (112), an automated process may search for stored records associated with the ATCC (102), and determine that, based upon the current time and date, based upon the ATCC's (102) current location, or based upon other information, that the ATCC (102) should be enabled, and in conditioning mode, rather than powered off. As a manual verification process, a user associated with the ATCC (102) may receive a notification via the user device (114) indicating the change from conditioning mode. In each case, information may be transmitted back to the remote access device (106) refusing confirmation or verification of the change (208), and the remote access device (106) may communicate with the control system (104) to revert (210), refuse, or otherwise negate the configuration change. Continuing the above example, this would result in the ATCC (102) either never leaving conditioning mode at all, or powering back on shortly after being manually powered off.

Where the configuration change is automatic (202) or a manual remote configuration change (204), the remote access device (106) will determine the type of configuration change. Configuration changes may include changes of one or more individual settings, such as a change to the climate control system to alter the desired temperature or humidity of the cargo area. Configuration changes may also include changes in a mode of operation in which the active systems of the ATCC are operating, which may include modes for when the ATCC is powered off or in storage, when the ATCC is in transit prior to receiving goods, when the ATCC is in transit and contains goods, or other modes. In some implementations, such a mode change may be a plurality of individual configuration changes that are organized together, and applied together. Received configuration changes may be intended to change the operation of the control system (104), the remote access device (106), some or all of the set of one or more sensors (122, 124, 126), or other devices that are part of or in communication with the ATCC.

As further examples, configuration changes may include one or more mode changes, such as placing the device into conditioning mode (212) or shipment mode (216), or may include one or more other individual configuration changes (220), which may include a custom change to temperature, lock status, or the enabling/disabling of various features or devices. Automatic configuration changes (202) may be scheduled based upon a time and day, or may be dynamically scheduled to start under a certain set of conditions. For example, one automatic change may be to place the ATCC (102) in conditioning mode based upon a geofencing or location-based occurrence, such as leaving a storage warehouse, or arriving at a courier facility.

Where the configuration change indicates that conditioning mode (212) should be entered, the remote access device (106) will cause the control system (104) to place the ATCC (102) into conditioning mode, which may include unlocking a door to the storage area, and running the climate control systems in an efficient cooling mode to gradually bring the temperature and humidity of the cargo area (103) and the surrounding materials (e.g., insulation, air pockets, phase change materials) to the desired levels.

Where the configuration change indicates that shipment mode (216) should be entered, the remote access device (106) will cause the control system (104) to place the ATCC (102) into shipment mode, which may include locking the door to the storage area, running the climate control systems in a higher performance mode to maintain desired temperatures, and activating various sensors to begin logging complete datasets describing the transit of the ATCC (102). While in shipment mode, the remote access device (106) may itself begin to actively log various data using the sensor pack (208), or may activate the set of one or more sensors (122, 124, 126) to begin producing and transmitting data to the remote access device (106).

Where the configuration change indicates a miscellaneous configuration change (220), the remote access device (106) may change particular configurations of the control system (104), or the remote access device (106) based on the received configuration change. Automatic configuration changes may be preventative changes intended to prevent or mitigate damage caused to goods by an actual or potential adverse transit event reflected in the status data received from the ATCC (102). For example, with reference to FIG. 2B, where data from the third sensor (126) shows a rapid increase in temperature, paired with a small but gradual increase in temperatures detected by the first sensor (122), the remote access server (112) may provide an automatic configuration change to operate the climate control systems at a higher performance level for a brief period of time, or may automatically lock the door and prevent local override or key code entry to the automatic lock, in order to prevent the door to the cargo area (103) from being opened until external temperatures stabilize.

The remote access device (106) may also be configured to transmit a notification to the remote access server (112) after a configuration change is successfully made, or reverted (210) in the case of an undesired local configuration change, and the remote access server (112) itself may provide a notification (226) to one or more users or other persons associated with the affected ATCC (102). This may include, for example, a notification that the ATCC (102) automatically entered conditioning or shipment mode, that a manual configuration change was successful, or that a courier or other person currently in possession of the ATCC (102) is making potentially undesirable local configuration changes to the active shipping container.

Figure 6:
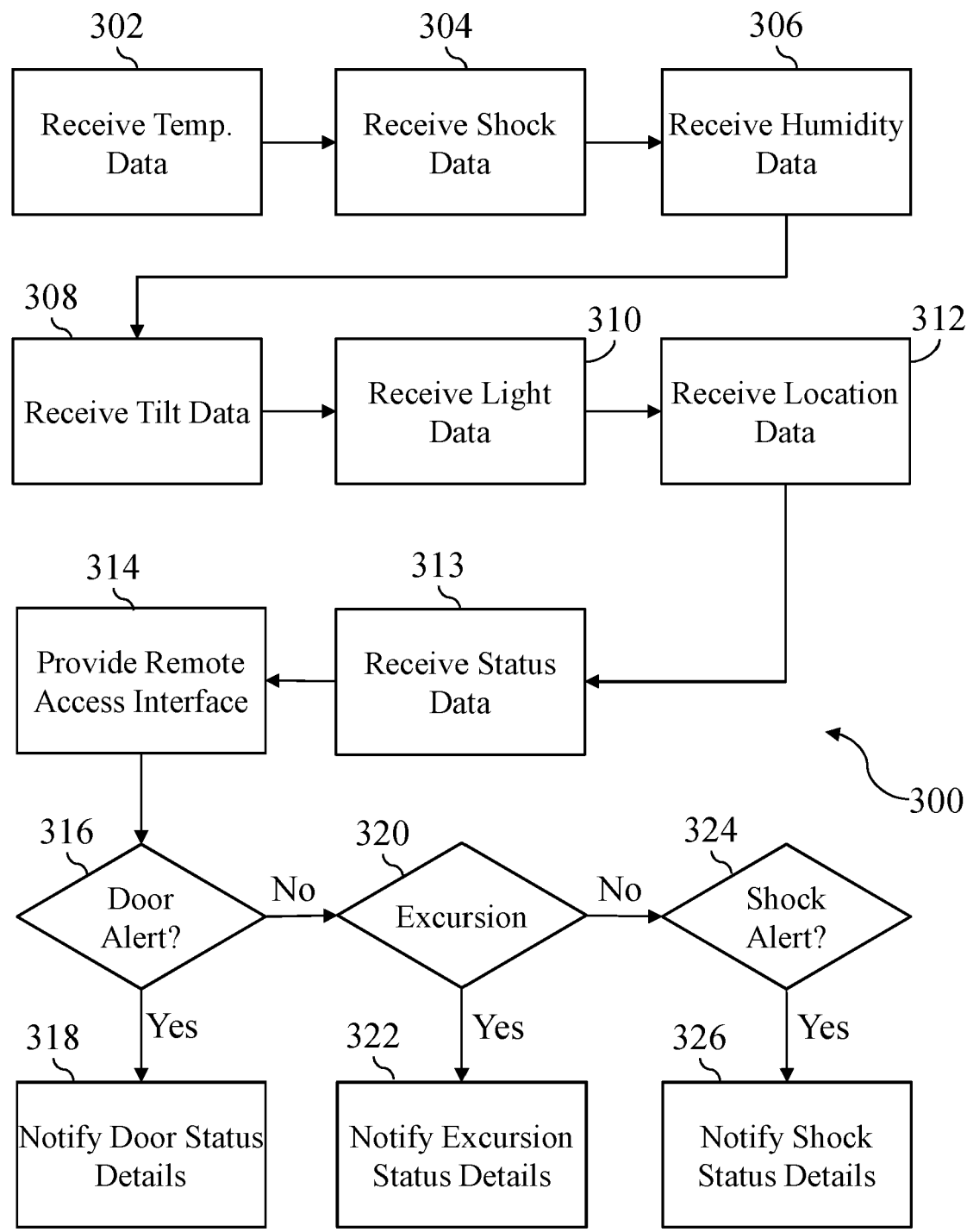
FIG. 6 shows a flowchart of an exemplary set of steps that may be performed with the system of FIG. 1 to gather information and provide alerts associated with an active shipping container.

As another example, FIG. 6 shows a flowchart of an exemplary set of steps (300) that may be performed with the system of FIG. 1 to gather information and provide alerts associated with an active shipping container such as the ATCC (102). As one or more sensors of the control system (104), the sensor pack (208), or the set of one or more sensors (122, 124, 126) generate datasets, such information may be stored to the remote access device (106) and regularly transmitted to the remote access server (112). Information received will vary depending upon the number, location, and capabilities of the sensors, but may include receiving (302) temperature data associated with one or more temperature sensors, receiving (304) impact or shock data associated with one or more accelerometers or motion sensors, receiving (306) humidity data associated with one or more humidity sensors, receiving (308) tilt or orientation data associated with one or more accelerometers, gyroscopes, or other sensors, receiving (310) illumination data associated with one or more photosensors, receiving (312) location data associated with one or more location sensors or devices such as GPS receivers, internet based location services, or other location sensors, and receiving (313) general status data associated with the ATCC (102) which may include lock status (e.g., locked or unlocked), door status (e.g., closed or open), battery status (e.g., charging or draining, and charge level), and other information.

Received information may then be used to populate and provide (314) a remote access interface to the user device (114) or another device, at which a user may view received data associated with the ATCC (102) in various forms, including maps showing movement of the ATCC (102) through transit lanes, time graphs showing various characteristics at different times during transit, and other interfaces. The remote access interface may also include notification and messaging capabilities that may provide alerts and other warnings to the user device (114). For example, each time the door to the cargo area (103) is opened, or when the door is opened for a period exceeding a configured threshold (316), the user device (114) may receive information notifying (318) the user of time and duration of the door opening, the location at which the door was opened, a person (e.g., a courier) responsible for the ATCC (102) at the time of opening, and other relevant information.

Where information is received indicating a current or potential future "excursion" (320) from a planned transit, which could include a delay in physical movement, a deviance from a planned route, or a deviance from a required storage temperature, the user device (114) may receive information notifying (322) the user of the excursion details, such as where the ATCC (102) currently is compared to where it should be, or predicted locations and temperatures for the ATCC (102) at various times in the future if no intervening action is taken.

Where information is received indicating an impact or shock event (324) exceeding a configured threshold, the user device (114) may receive information notifying (326) a user of the device of the time, location, and magnitude of the impact. Other useful notifications dependent upon received information exist, and will be apparent to one of ordinary skill in the art in light of this disclosure.

Figure 7:
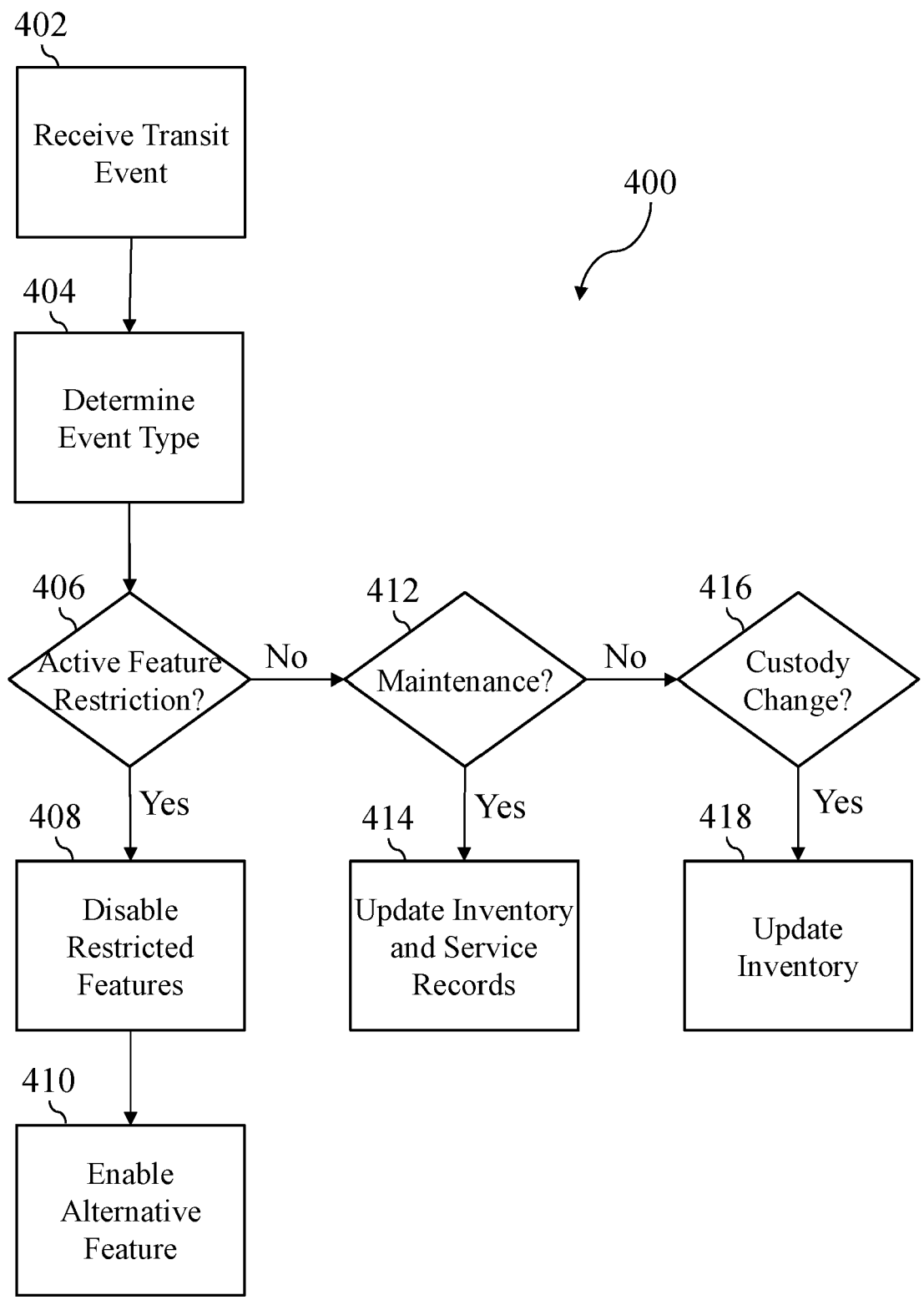
FIG. 7 shows a flowchart of an exemplary set of steps that may be performed with the system of FIG. 1 to provide automatic configuration changes and other features based on transit events.

As another example, FIG. 7 shows a flowchart of an exemplary set of steps (400) that may be performed with the system of FIG. 1 to provide automatic configuration changes and other features based on transit events. A transit event may include, for example, a location of the ATCC (102) being registered in certain areas or location, including geofencing and other location-based triggers. Another example of a transit event may include movement of the ATCC (102) as indicated by accelerometer or position data indicative of transit at varying speeds. Another example of a transit event may include passing of the ATCC (102) from one party to another, such as a courier retrieving the active shipping container from a sender, or providing the active shipping container to a recipient, as may be indicated by entry of a code or another interaction with the control system (104) during the exchange.

As transit events occur and are received (402) at the access control server (112) via the remote access device (106), the access control server (112) may determine (404) the event type for the transit event, which may include identifying information contained in the received (402) information, identifying other information stored in databases available to the access control server (112), or both. As an example, a transit event may be determined (404) based upon location information received from a container, and a configured geofence or other location-based trigger available to the access control server (112). As another example, a transit event may be determined (404) based upon location information and accelerometer information received from a container, and a configured transit for the active shipping container indicating that the active shipping container was located at an airfield, that the active shipping container's transit lane included a flight, and that the active shipping container recently accelerated to flight speeds. As another example, a transit event may be determined (404) based upon location information, and a configured transit for the active shipping container indicating that the active shipping container was located at a maintenance or storage facility, and was scheduled to leave the facility and be put into service at a scheduled time. As can be seen from the above non limiting examples, individual data or various combinations of data, including information received from the active shipping container itself as well as information stored and available to the remote access server (112), may be used to determine that various transit events have happened.

Actions taken as a result of transit events will also vary greatly based upon the exact event. As an example, some transit events may be determined (404) to require an active feature restriction (406). During some portions of a transit lane, one or more active features of a container may need to be disabled for technical, safety, or regulatory reasons. Some courier vehicles may require that any climate control systems of carried containers be disabled, or that audible, visual, or other alerts or alarms be deactivated or provided in an alternate way that would not distract or endanger a driver. Similarly, some airplanes may require that wireless communication devices be disabled during some portions of a flight. Where the transit event requires active feature restrictions (406), the remote access device (106) may reconfigure the control system (104), may reconfigure the remote access device (106) itself, or may reconfigure one or more of the sensors (122, 124, 126) as required in order to deactivate or disable (408) the restricted features.

In some cases, where alternative or replacement features are included in the ATCC (102), or are available in the surrounding environment, the remote access device (106) may enable (410) the alternative feature. This may include, for example, disabling communication over the cellular network (110) and enabling communication over the satellite network (108), or the opposite. As another example, this may include deactivating climate control systems, and opening vents in the case of the ATCC (102) to allow cooled air from a courier vehicle interior to circulate through the active shipping container.

As another example, this may include switching from a power supply such as an internal battery of the ATCC (102) to an externally available power supply, and reconfiguring one or more of the active systems of the ATCC (102) to take advantage of the temporarily available external power supply and allow the internal battery to charge during transit. This may include one or more of the systems, features, and techniques such as those described in U.S. Pat. Pub. 2019/0044360, entitled "System for Providing In-Transit Power for Active Storage Containers", filed Jul. 26, 2018, the entirety of which is hereby incorporated by reference.

As another example, this may include deactivating some or all of the features of the short range wireless transceivers (202) and the long range wireless transceivers (200) (e.g., such as in "airplane mode"), and routing communication through an alternate wireless communication device (e.g., an airline approved wireless device such as a Bluetooth transceiver or Wi-Fi transceiver) which may allow the remote access device (106) to continue to communicate over the internet by "bridging" to a data connection available on the airplane. This may include one or more data bridging systems, features, and techniques such as those described in U.S. Pat. Pub. 2019/0044753, entitled "Active Container with Data Bridging", filed Jul. 26, 2018, the entirety of which is hereby incorporated by reference.

Where it is determined (404) that the transit event relates to a maintenance task (412), the remote access server (112) may update (414) inventory and service records related to the associated active shipping container. The maintenance related event (412) may be associated with and describe an active shipping container being transported to a maintenance facility, an active shipping container spending time at a maintenance facility, or an active shipping container being transported out of a maintenance facility. In such cases, the remote access server (112) may create or update (414) records associated with the active shipping container to indicate its inventory status and maintenance status, which may include indicating that the active shipping container is out of service when it is transported to a maintenance facility, or that the active shipping container is ready for service when it is transported out of a maintenance facility. Actions may also include creating records indicating the last maintenance date, the location where maintenance was performed, and any status information (e.g., battery charged or replaced, climate control systems tested and cleaned, sensors calibrated) associated with the maintenance, which may include status information prior to maintenance, and after the completion of maintenance Where it is determined (404) that the transit event relates to the active shipping container being passed from a storage facility to a sender, from a sender to a courier, between multiple couriers, or from a courier to the final recipient, it may be determined as a change of custody (416) of the active shipping container. Changes in custody may be determined based upon one or more of location information for the active shipping container, the scheduled transit lane for the active shipping container, or user interactions with the control system (104) (e.g., entering a code or otherwise providing input). For example, when the remote access server (112) receives information showing that the active shipping container is at the recipient's facility, on a time and date where the scheduled transit lane indicates the active shipping container should have been delivered to the recipient, the remote access server (212) may make a determination that the active shipping container was delivered, and may update (418) inventory records and other records associated with the active shipping container to reflect the courier or company that is in possession of the active shipping container, when and where they took possession of the active shipping container, the active shipping container's status information (e.g., temperature, battery charge, lock status) at the time of possession, and other information. Similar information may be received and updated (418) for the active shipping container when it leaves the recipient's facility and returns to the sender or company that owns the active shipping container, or is transferred to a maintenance or reconditioning facility, as has been described.

By tracking such information (e.g., inventory, maintenance, service, and custody records) throughout the complete lifecycle of a container, the remote access server (112) may build a rich set of information that may be used to review or audit the active shipping container's lifecycle, which may be helpful to automatically or manually identify patterns in the treatment of containers that may result in reduced performance, failure of components, or loss or damage to equipment, including the active shipping container itself.

It should be understood that, for features such as those disclosed in FIGS. 5-8, where the remote access device (106) is in bi-directional communication with the remote access server (112), such communication could occur on-demand and as needed, such as where the remote access device (106) would be in frequent communication with the remote access server (112) in order to exchange data and enable automated activities. However, such communication could also occur intermittently, with more information and data being stored on the memory (206) or another storage device of the remote access device (106), which may result in more efficient communication, and improved robustness when the remote access server (112) is unreachable. As an example, instead of the remote access server (112) receiving (402) transit events, and determining (404) the event type based upon configured rules and data stored by the remote access server (112), those rules and information could be pushed to the remote access device (106) at the start of transit, and much of the processing and application of those rules could be performed by the processor (204) without the need for frequent bi-directional communication with the remote access server (112). Other variations on the transfer of data between the remote access server (112) and the remote access device (106) exist, and will be apparent to those of ordinary skill in the art in light of this disclosure.

As mentioned above, data provided by the remote access device (106) may be used by the remote access server (106) to identify various patterns associated with transit of active shipping containers. This may include identifying portions of a transit lane that are having a negative, or positive impact on containers that are carried along that portion. As an example, a particular transit lane defined for a container may include traveling by ground vehicle along a first road and a first highway, traveling via airplane with a first carrier, and then traveling by ground vehicle along a second road and a second highway to the recipient. Distinct portions of that transit lane may include the first road, the second road, the first highway, the second highway, and the first carrier. As an example, data gathered for numerous active shipping containers that use the first road may indicate, over time, that containers using that road have a higher incidence of delays, or problems maintaining temperature. Similarly, data over time may indicate that containers that are flown by the first carrier have a higher incidence of battery failures, or exterior damage to the active shipping container, or other factors, as an example. By identifying characteristics that are associated with a particular portion of transit lanes, or a combination of several portions (e.g., such as where the first road and the first highway by themselves have no issues, but the sequence of both results in uncommon delays), future transit lanes may be configured to avoid the portion or combination of portions.

Figure 8:
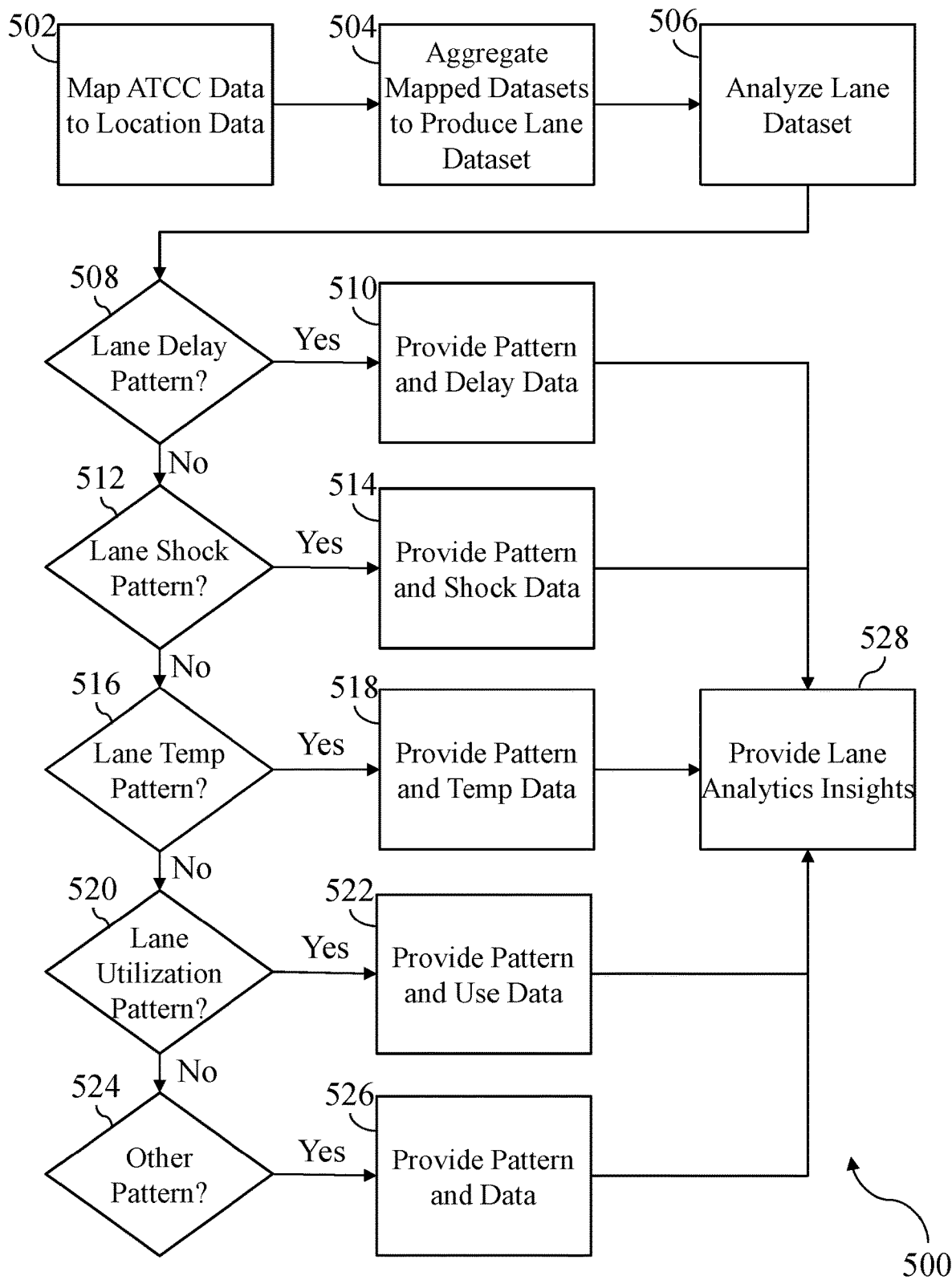
FIG. 8 shows a flowchart of an exemplary set of steps that may be performed with the system of FIG. 1 to identify events occurring within a transit lane.

As an example, FIG. 8 shows a flowchart of an exemplary set of steps (500) that may be performed with the system of FIG. 1 to identify patterns of events occurring within a transit lane. The remote access server (112) may map (502) data from a plurality of ATCC's, across a plurality of transits, to location data associated with each data point to produce a plurality of mapped datasets. The mapped dataset for each container and each transit may include a timeline of transit, with relevant data and location data at various points along the timeline, and could be used to determine, for example, that a particular container on a particular transit received a shock impact of great enough magnitude that its contents would need to be inspected for damage. The shock impact would be associated with a time, date, and location.

Numerous mapped datasets may then be aggregated (504) together to produce a lane dataset for each distinct transit lane portion, or combination of transit lane portions. The lane dataset may then be analyzed (506), along with other lane datasets, using a pattern recognition algorithm or software, or based upon discrete analysis for certain characteristics or factors (e.g., traffic accidents, flight delays) in order to identify lane datasets associated with a high occurrence of the sought characteristics. As an example, if analysis (506) of the lane dataset compared to other lane datasets indicates that a high number of transits along that lane portion also experience a shock impact, it may indicate a poor road surface or other obstruction that should be addressed or avoided. Similarly, within that particular lane dataset, if the overall number of shock impacts is comparable, but the shock impacts on that transit lane portion are frequently experienced at the same time of day, same day of week, or based upon other more detailed factors, that may indicate that there is a road condition that is present at certain times or days (e.g., a transit lane near a school may result in sudden stops that are registered as shocks impacts at school dismissal time, but not at other times), but not others, that also may be accounted for. If the shock impact in that portion is a rare occurrence, or there seems to be no pattern, then no action may be necessary.

Based upon the analysis (506) of the lane dataset, or a plurality of lane datasets, patterns may be identified such as lane delay patterns (508), where a particular transit lane portion may have a high or low occurrence of associated delays, lane shock patterns (512), where the transit lane portion may have a high or low occurrence of shock impacts, lane temperature patterns (516), where the transit lane portion may have a high or low occurrence of temperature problems or excursions, lane utilization patterns (520), where the transit lane portion may have a high or low utilization for transit of tracked containers, or other patterns or sub-patterns, such as where the transit lane portion has a temporal (e.g., based on time, day, season, or other temporal aspect) pattern of undesirable characteristics, or patterns based upon other less predictable criteria, such as gas prices, weather, sporting events or concerts, and other events that may over time impact transit on that transit lane portion.

Where such patterns are present, they may be identified to a user, or identified within the dataset as a pattern that may be worth additional research or observation. Where a pattern of delays is identified (508) for a lane portion or portions, the pattern may be provided (510) as data, a user interface, or both that may describe, for example, the lane portion, the identified pattern, the associated delays, a comparison to other "normal" lane portions, and other similar information. The pattern may be provided (510) pro-actively, as a notification or alert to a user, or may be accessible to a user reviewing that lane portion or scheduling a transit lane that relies upon that lane portion, or may be provided (510) to a database or other storage accessible to the remote access server (112) for future use. Similar data may be provided (514) when a shock pattern is detected, may be provided (518) when a temperature pattern is detected, may be provided (522) when a use or utilization pattern is detected, or may be provided (526) when another pattern is detected.

As pattern data is gathered, refined, and built over time, the remote access server (112) may be configured to provide (528) lane insights automatically when a transit lane is scheduled, based upon previously gathered and identified patterns. For example, where a container transit is being scheduled and the user manually selects the transit lanes (e.g., roads, ground couriers, air couriers), or automatically selects them based upon a desired cost, time of delivery, or other factors, the system may provide (528) a set of lane analytics insights to the user proposing one or more cautions, concerns, or modifications to the transit lane, based upon identified patterns. As an example, a user may select low cost options for transit when manually configuring their transit lane, which may include a portion of transit along the first road, and a portion along the first highway, from the example above. Previous identified patterns may have provided (510) data indicating uncommonly high delays for that combination of transit portions, and this pattern may be provided to the scheduling user as a caution or warning, and may also include an appropriate replacement transit lane portion (e.g., the first road, and a third road, avoiding the first highway altogether), which may not be associated with a pattern of delays.

Other uses for gathered data and patterns beyond those described above exist, and will be apparent to those of ordinary skill in the art in light of this disclosure. Additional examples of potential embodiment which may be implemented based on this disclosure include the following.

Example 1

A system comprising: (a) a container comprising a cargo area, at least one active feature, and a control system operable to configure the at least one active feature; (b) a remote access device configured to communicate over a long-range data network, wherein the remote access device is communicatively coupled with the control system; and (c) a remote access server in communication with the remote access device over the long-range data network; wherein the remote access device is configured to: (i) receive a set of control system data from the control system, the set of control system data describing the performance of the at least one active feature; (ii) provide the set of control system data to the remote access server; (iii) receive a configuration change from the remote access server, the configuration change associated with the at least one active feature; and (iv) cause the control system to configure the operation of the at least one active feature based on the configuration change.

Example 2

The system of example 1, wherein: (i) the remote access device is coupled with the control system to receive power from the control system; (ii) the at least one active feature includes a climate control system and a temperature sensor; (iii) the control system data comprises a set of temperature data for the cargo area; and (iv) the long-range data network comprises a cellular data network.

Example 3

The system of example 1, wherein: (i) the remote access device is positioned within the cargo area; (ii) the remote access device comprises a sensor pack, the sensor pack comprising a temperature sensor; and (iii) the remote access device is further configured to produce a set of temperature data with the temperature sensor, and provide the set of temperature data to the remote access server.

Example 4

The system of example 1, further comprising a set of sensors communicatively coupled with the remote access device via a short-range wireless transceiver, wherein: (i) each of the set of sensors is positioned at a different location within or near the cargo area; and (ii) each of the set of sensors produced temperature data for the area at which it is positioned; (iii) the remote access device is configured to: (A) receive temperature data from each sensor of the set of sensors; (B) associate the temperature from each sensor with a location for that sensor; and (C) provide the temperature data and the associated location for each sensor to the remote access server.

Example 5

The system of example 1, wherein the remote access server is configured to: (i) prior to providing the configuration change to the remote access device, receive the configuration change from a user; and (ii) identify the container as being associated with the configuration change and the user.

Example 6

The system of example 5, wherein the at least one active feature comprises a climate control system, and the configuration change comprises activating the climate control system in a conditioning mode to lower the temperature of the cargo area.

Example 7

The system of example 1, wherein the set of control system data comprises a door status that indicates whether a door to the cargo area is open, wherein the remote access server is configured to: (i) identify, based upon the door status, a door open event that exceeds a configured time threshold; and (ii) provide a notification to a user associated with the container describing the door open event.

Example 8

The system of example 1, wherein the remote access server is configured to receive a set of sensor data from the remote access device, wherein the set of sensor data comprises one or more of: (i) temperature data associated with one or more areas of the container; (ii) shock impact data associated with one or more areas of the container; (iii) tilt data associated with one or more areas of the container; (iv) illumination data associated with one or more areas of the container; or (v) global position data associated with the container.

Example 9

The system of example 8, wherein the remote access server is configured to: (i) identify, within the set of sensor data or the set of control system data, a shock impact that exceeds a configured threshold for safe impact to the container; and (ii) provide a notification to a user associated with the container describing the shock impact.

Example 10

The system of example 8, wherein the remote access server is configured to: (i) identify, within the set of sensor data, an area of the container in which the temperature exceeded a configured threshold; and (ii) provide a notification to a user associated with the container describing the temperature, and the period of time for which the temperature exceeded the configured threshold.

Example 11

The system of example 1, further comprising a position sensor operable to produce data indicating a global position of the container, wherein the remote access device is configured to: (i) receive a geofencing configuration from the remote access server, wherein the geofencing configuration comprises a global position requirement and an associated configuration change; (ii) monitor a position of the container based on data from the position sensor; and (iii) when the position of the container satisfies the global position requirement, apply the associated configuration change.

Example 12

The system of example 11, wherein the associated configuration change comprises: (i) configuring the remote access device to disable communication over the long-range data network when the global position requirement is satisfied; and (ii) configuring the remote access device to enable communication over the long-range data network when the global position requirement is no longer satisfied.

Example 13

The system of example 1, further comprising a position sensor operable to produce data indicating a global position of the container, wherein the remote access server is configured to: (i) receive a set of position data produced by the position sensor; (ii) map the set of control system data to the set of position data to produce a mapped dataset that describes a transit lane traveled by the container; (iii) aggregate the mapped dataset with a plurality of mapped datasets to produce a plurality of lane datasets, wherein each lane dataset describes at least a portion of a transit lane, the plurality of lane datasets including the transit lane traveled by the container; and (iv) identify a pattern associated with one or more of plurality of lane datasets, wherein the pattern describes an adverse transit event that occurs at a higher rate on that transit lane.

Example 14

A method comprising: (a) coupling a remote access device with a control system of an active shipping container, the active shipping container comprising at least one active feature and a cargo area; (b) receiving a set of control system data from the control system with the remote access device, the set of control system data describing the performance of the at least one active feature; (c) providing the set of control system data to a remote access server in communication with the remote access device over a long-range data network; (d) receiving a configuration change from the remote access server, the configuration change associated with the at least one active feature; and (e) causing the control system to configure the operation of the at least one active feature based on the configuration change.

Example 15

The method of example 14, further comprising: (a) placing the remote access device in the cargo area, and coupling the remote access device with the control system to provide power to the remote access device; (b) producing a set of temperature data with a sensor pack of the remote access device; and (c) providing the set of temperature data to the remote access server.

Example 16

The method of example 14, further comprising: (a) communicatively coupling the remote access device with a set of sensors via short range wireless communication; (b) placing each sensor of the set of sensors in a different location within the cargo area; (c) receiving a set of temperature data from each of the set of sensors, and associating each set of temperature data with a location of that sensor within the cargo area; and (d) provide the set of temperature data and the location for each sensor of the set of sensors to the remote access server.

Example 17

The method of example 16, further comprising: (a) storing a plurality of cargo payloads in the cargo area; (b) associating each cargo payload with a proximate sensor of the set of sensors based upon the location for that sensor; (c) providing, for each cargo payload of the set of cargo payloads, a storage temperature during transit based upon the set of temperature data for the proximate sensor.

Example 18

The method of example 14, further comprising: (a) receiving a set of position data produced by a position sensor proximate to the active shipping container, the position sensor operable to produce data indicating a global position of the active shipping container; (b) mapping the set of control system data to the set of position data to produce a mapped dataset that describes a transit lane traveled by the active shipping container; (c) aggregating the mapped dataset with a plurality of mapped datasets to produce a plurality of lane datasets, wherein each lane dataset describes at least a portion of a transit lane, the plurality of lane datasets including the transit lane traveled by the active shipping container; and (d) identifying a pattern associated with one or more of plurality of lane datasets, wherein the pattern describes an adverse transit event that occurs at a higher rate on that transit lane.

Example 19

The method of example 14, further comprising: (a) receiving a set of position data produced by a position sensor proximate to the active shipping container, the position sensor operable to produce data indicating a global position of the active shipping container; (b) receiving a geofencing configuration from the remote access server, wherein the geofencing configuration comprises a global position requirement and an associated configuration change; (c) monitoring a position of the active shipping container based on data from the position sensor; and (d) when the position of the active shipping container satisfies the global position requirement, applying the associated configuration change.

Example 20

A remote access device for enabling remote management of an active shipping container, comprising: (a) a processor and a memory; (b) a connection adapted to couple with a control system of the active shipping container and provide transfer of data and power to the remote access device; (c) a long-range wireless transceiver operable to communicate over a long range data network; (d) a set of sensors, wherein each of the set of sensors comprises a power source, and is adapted to be placed at a desired location within the cargo area; (e) a short-range wireless transceiver operable to receive temperature data from each of the set of sensors; wherein the processor is configured to: (i) receive a set of control system data from the control system; (ii) receive a set of temperature data from each sensor of the set of sensors; (iii) associate the set of temperature data from each sensor of the set of sensors with a location at which that sensor is placed within the cargo area to produce a set of mapped sensor data for the cargo area; and (iv) provide the set of control system data and the set of mapped sensor data to a remote access server.

It should be understood that any one or more of the teachings, expressions, embodiments, examples, etc. described herein may be combined with any one or more of the other teachings, expressions, embodiments, examples, etc. that are described herein. The described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

The invention claimed is:

1. A system comprising:
 (a) a container comprising:
  (1) a cargo area,
  (2) a plurality of active features comprising a climate control system and a door lock, and
  (3) a control system operable to configure the plurality of active features, wherein the control system is configured with a plurality of modes comprising an initial conditioning mode and a subsequent transit mode, wherein the initial conditioning mode and the subsequent transit mode each define settings for the climate control system and a corresponding setting for the door lock, wherein the settings for the climate control system and the door lock which correspond to the initial conditioning mode are different from the settings for the climate control system and the door lock which correspond to the subsequent transit mode;
 (b) a remote access device configured to communicate over a data network, wherein the remote access device is communicatively coupled with the control system; and
 (c) a remote access server in communication with the remote access device over the data network;
 wherein the remote access device is configured to:
  (i) receive a set of control system data from the control system, the set of control system data describing the performance of at least one active feature from the plurality of active features;
  (ii) provide the set of control system data to the remote access server;
  (iii) receive a configuration change from the remote access server, the configuration change associated with the settings for the climate control system and the door lock; and
  (iv) cause the control system to configure the operation of the settings for the climate control system and the door lock based on the configuration change;
 wherein the remote access server is configured to:
  (I) receive a set of position data produced by the position sensor;
  (II) map the set of control system data to the set of position data to produce a mapped dataset that describes a transit lane traveled by the container;
  (III) aggregate the mapped dataset with a plurality of mapped datasets to produce a plurality of lane datasets, wherein each lane dataset describes at least a portion of a transit lane, the plurality of lane datasets including the transit lane traveled by the container;
  (IV) compare the mapped dataset relative to the plurality of lane datasets;
  (V) identify a future adverse transit event based on the comparing, wherein the future adverse transit event exceeds at least one of:
   (A) a predetermined delay in the position data of the container, (B) a predetermined deviance from a planned route of the container, or
(C) a predetermined deviance from a storage temperature of the container; and
(VI) determine the configuration change to avoid the future adverse transit event.

2. The system of claim 1, wherein the remote access device is coupled with the control system to receive power from the control system.

3. The system of claim 1, wherein:
(i) the remote access device is positioned within the cargo area;
(ii) the remote access device comprises a sensor pack, the sensor pack comprising a temperature sensor; and
(iii) the remote access device is further configured to produce a set of temperature data with the temperature sensor, and provide the set of temperature data to the remote access server.

4. The system of claim 1, further comprising a set of sensors communicatively coupled with the remote access device via a short-range wireless transceiver, wherein:
(i) each of the set of sensors is positioned at a different location within or near the cargo area; and
(ii) each of the set of sensors produces temperature data for the area at which it is positioned;
(iii) the remote access device is configured to:
(A) receive temperature data from each sensor of the set of sensors;
(B) associate the temperature from each sensor with a location for that sensor; and
(C) provide the temperature data and the associated location for each sensor to the remote access server.

5. The system of claim 1, wherein the set of control system data comprises a door status that indicates whether a door to the cargo area is open, wherein the remote access server is configured to:
(i) identify, based upon the door status, a door open event that exceeds a configured time threshold; and
(ii) provide a notification to a user associated with the container describing the door open event.

6. The system of claim 1, wherein the remote access server is configured to receive a set of sensor data from the remote access device, wherein the set of sensor data comprises one or more of:
(i) temperature data associated with one or more areas of the container;
(ii) shock impact data associated with one or more areas of the container;
(iii) tilt data associated with one or more areas of the container;
(iv) illumination data associated with one or more areas of the container; or
(v) global position data associated with the container.

7. The system of claim 6, wherein the remote access server is configured to:
(i) identify, within the set of sensor data or the set of control system data, a shock impact that exceeds a configured threshold for safe impact to the container; and
(ii) provide a notification to a user associated with the container describing the shock impact.

8. The system of claim 6, wherein the remote access server is configured to:
(i) identify, within the set of sensor data, an area of the container in which the temperature exceeded a configured threshold; and (ii) provide a notification to a user associated with the container describing the temperature, and the period of time for which the temperature exceeded the configured threshold.

9. The system of claim 1, wherein the further comprising a position sensor operable to produce data indicating a global position of the container, wherein the remote access device is configured to:
(i) receive a geofencing configuration from the remote access server, wherein the geofencing configuration comprises a global position requirement and an associated configuration change;
(ii) monitor a position of the container based on data from the position sensor; and
(iii) when the position of the container satisfies the global position requirement, apply the associated configuration change.

10. The system of claim 9, wherein the data network is a long-range data network, wherein the associated configuration change comprises:
(i) configuring the remote access device to disable communication over the long-range data network when the global position requirement is satisfied; and
(ii) configuring the remote access device to enable communication over the long-range data network when the global position requirement is no longer satisfied.

11. The system of claim 1, wherein while in transit mode, the remote access device is configured to activate the set of sensors, and produce and transmit data to the remote access device.

12. The system of claim 1, wherein the remote access server is configured to automatically apply the configuration change after determining the configuration change.

13. A method comprising:
(a) coupling a remote access device with a control system of an active shipping container, the active shipping container comprising a plurality of active features and a cargo area, the plurality of active features comprising a climate control system and a door lock, the control system being configured with a plurality of modes including a conditioning mode and a transit mode, each of which defines settings for the climate control system and a corresponding setting for the door lock;
(b) receiving a set of control system data from the control system with the remote access device, the set of control system data describing the performance of at least one active feature from the plurality of active features;
(c) providing the set of control system data to a remote access server in communication with the remote access device over a data network;
(d) receiving a configuration change from the remote access server, the configuration change being from the conditioning mode to the transit mode, wherein the conditioning mode and the transit mode each define the settings for the climate control system and the door lock;
(e) causing the control system to change from the conditioning mode to the transit mode to change the settings for the climate control system and the door lock;
(f) receiving a set of position data produced by a position sensor proximate to the active shipping container, the position sensor operable to produce data indicating a global position of the active shipping container;
(g) mapping the set of control system data to the set of position data to produce a mapped dataset that describes a transit lane traveled by the active shipping container;

(h) aggregating the mapped dataset with a plurality of mapped datasets to produce a plurality of lane datasets, wherein each lane dataset describes at least a portion of a transit lane, the plurality of lane datasets including the transit lane traveled by the active shipping container;
(i) comparing the mapped dataset relative to the plurality of lane datasets;
(j) identifying a future adverse transit event based on the comparing, wherein the future adverse transit event exceeds at least one of:
 (A) a predetermined delay in the position data of the container,
 (B) a predetermined deviance from a planned route of the container, or
 (C) a predetermined deviance from a storage temperature of the container; and
(k) determining the configuration change to avoid the adverse transit event.

14. The method of claim 13, further comprising placing the remote access device in the cargo area, and coupling the remote access device with the control system to provide power to the remote access device.

15. The method of claim 13, further comprising:
(a) communicatively coupling the remote access device with a set of sensors via short range wireless communication;
(b) placing each sensor of the set of sensors in a different location within the cargo area;
(c) receiving a set of temperature data from each of the set of sensors, and associating each set of temperature data with a location of that sensor within the cargo area; and
(d) provide the set of temperature data and the location for each sensor of the set of sensors to the remote access server.

16. The method of claim 15, further comprising:
(a) storing a plurality of cargo payloads in the cargo area;
(b) associating each cargo payload with a proximate sensor of the set of sensors based upon the location for that sensor;
(c) providing, for each cargo payload of the set of cargo payloads, the storage temperature during transit based upon the set of temperature data for the proximate sensor.

17. The method of claim 13, further comprising:
(a) receiving a geofencing configuration from the remote access server, wherein the geofencing configuration comprises a global position requirement and an associated configuration change;
(b) monitoring a position of the active shipping container based on data from the position sensor; and
(c) when the position of the active shipping container satisfies the global position requirement, applying the associated configuration change.

18. The method of claim 13, wherein:
the settings for the climate control system and the door lock which correspond to the conditioning mode are different from the settings for the climate control system and the door lock which correspond to the transit mode.

19. A system comprising:
(a) a container comprising a cargo area, a plurality of active features, and a control system operable to configure the plurality of active features, the plurality of active features comprising a climate control system and a door lock, wherein the control system is configured with a plurality of modes, wherein each mode from the plurality of modes defines settings for the climate control system and a corresponding setting for the door lock;
(b) a remote access device configured to communicate over a data network, wherein the remote access device is communicatively coupled with the control system; and
(c) a remote access server in communication with the remote access device over the data network;
wherein the remote access device is configured to:
(i) receive a set of control system data from the control system, the set of control system data describing the performance of at least one active feature from the plurality of active features;
(ii) provide the set of control system data to the remote access server;
(iii) receive a configuration change from the remote access server, the configuration change associated with the settings for the climate control system and the door lock; and
(iv) cause the control system to configure the operation of the climate control system and the door lock based on the configuration change,
wherein the remote access server is configured to:
(I) receive a set of position data produced by the position sensor;
(II) map the set of control system data to the set of position data to produce a mapped dataset that describes a transit lane traveled by the container;
(III) aggregate the mapped dataset with a plurality of mapped datasets to produce a plurality of lane datasets, wherein each lane dataset describes at least a portion of a transit lane, the plurality of lane datasets including the transit lane traveled by the container;
(IV) identify a temporal pattern associated with one or more of the plurality of lane datasets, wherein the temporal pattern is based on at least one of time, day, or season and describes an adverse transit event that occurs at a higher rate on the transit lane portions described in the one or more lane datasets; and
(V) determine the configuration change to avoid the future adverse transit event.

20. The system of claim 19, wherein the remote access device is configured to communicate over at least one of a long-range data network or a short-range data network, wherein the remote access server is in communication with the remote access device over at least one of the long-range data network or the short-range data network.

* * * * *